(12) United States Patent
Meitz et al.

(10) Patent No.: US 9,658,363 B2
(45) Date of Patent: May 23, 2017

(54) FILMS INCLUDING TRIAZINE-BASED ULTRAVIOLET ABSORBERS

(75) Inventors: David W. Meitz, St. Paul, MN (US); Bimal V. Thakkar, Woodbury, MN (US); David M. Burns, Woodbury, MN (US); David B. Olson, Marine on St. Croix, MN (US); Lee A. Pavelka, Cottage Grove, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 178 days.

(21) Appl. No.: 14/001,958

(22) PCT Filed: Mar. 30, 2012

(86) PCT No.: PCT/US2012/031402
§ 371 (c)(1),
(2), (4) Date: Aug. 28, 2013

(87) PCT Pub. No.: WO2012/135595
PCT Pub. Date: Oct. 4, 2012

(65) Prior Publication Data
US 2014/0009824 A1 Jan. 9, 2014

Related U.S. Application Data

(60) Provisional application No. 61/470,568, filed on Apr. 1, 2011.

(51) Int. Cl.
*G02B 5/20* (2006.01)
*G02B 1/04* (2006.01)
(Continued)

(52) U.S. Cl.
CPC .............. *G02B 1/04* (2013.01); *C08F 220/18* (2013.01); *C08K 5/3492* (2013.01);
(Continued)

(58) Field of Classification Search
CPC .......... G02B 5/22; G02B 5/208; G02B 5/283; G02B 5/12–5/128
(Continued)

(56) References Cited

U.S. PATENT DOCUMENTS 5,450,235 A 9/1995 Smith
5,691,846 A 11/1997 Benson
(Continued)

FOREIGN PATENT DOCUMENTS

EP 0 220 897 A1 5/1987
EP 0 981 585 B1 3/2000
(Continued)

OTHER PUBLICATIONS

Basfar, Natural weathering test for films of various formulations of low density polyethylene (LDPE) and linear low density polyethylene (LLDPE); Polymer Degradation and Stability, 2006, vol. 91, No. 3, pp. 437-443.
(Continued)

*Primary Examiner* — Bumsuk Won
*Assistant Examiner* — Jeffrey Madonna
(74) *Attorney, Agent, or Firm* — Trisha D. Adamson

(57) ABSTRACT

The present application generally relates to EAA films including at least one triazine-based ultraviolet absorber. The present application also generally related to retroreflective sheeting including an EAA film including a triazine-based ultraviolet absorber. One embodiments of the present application relates to a film, comprising poly(ethylene-co-acrylic acid) and a triazine-based UVA. Another embodiment of the present application relates to retroreflective sheeting, comprising: a plurality of cube corner elements; and a body layer adjacent to the cube corner elements, the body layer including poly(ethylene-co-acrylic acid) and a triazine-based UVA.

20 Claims, 1 Drawing Sheet

(51) Int. Cl.
C08L 23/08 (2006.01)
C08F 220/18 (2006.01)
C08K 5/3492 (2006.01)
G02B 5/124 (2006.01)

(52) U.S. Cl.
CPC .......... *C08L 23/0869* (2013.01); *G02B 5/124* (2013.01); *G02B 5/208* (2013.01)

(58) Field of Classification Search
USPC ....... 359/350, 359, 361, 529–530, 614, 884, 359/885
See application file for complete search history.

(56) References Cited

U.S. PATENT DOCUMENTS

| | | | |
|---|---|---|---|
| 5,861,211 A * | 1/1999 | Thakkar | B32B 7/12 156/273.3 |
| 6,225,384 B1 | 5/2001 | Renz et al. | |
| 7,314,284 B2 | 1/2008 | Koizuumi | |
| 8,434,885 B2 * | 5/2013 | Hamasaki | B29C 47/0021 264/1.1 |
| 2001/0016241 A1 | 8/2001 | Olson | |
| 2002/0102389 A1 | 8/2002 | Nielsen | |
| 2003/0012912 A1 | 1/2003 | Olson | |
| 2004/0241111 A1 | 12/2004 | Lazzari et al. | |
| 2007/0154704 A1 | 7/2007 | Debergalis | |
| 2010/0182689 A1* | 7/2010 | Nakanishi et al. | 359/485 |
| 2012/0011850 A1* | 1/2012 | Hebrink | F24J 2/07 60/641.15 |

FOREIGN PATENT DOCUMENTS

| | | |
|---|---|---|
| JP | S57-182339 A | 11/1982 |
| JP | S57-182340 A | 11/1982 |
| JP | 2001-002842 A | 1/2001 |
| JP | 2003-061483 A | 3/2003 |
| JP | 2003-300288 | 10/2003 |
| JP | 2004-043595 A | 2/2004 |
| JP | 2006-117833 | 5/2006 |
| WO | WO 95/11466 A1 | 4/1995 |
| WO | WO 96/03285 A1 | 2/1996 |
| WO | WO 98-49207 | 11/1998 |
| WO | WO 00/66675 A1 | 11/2000 |
| WO | WO 01/56998 A1 | 8/2001 |
| WO | WO 02/42281 A1 | 5/2002 |
| WO | WO 2011-152977 | 12/2011 |

OTHER PUBLICATIONS

Bojinov, "Synthesis and application of new combined 2,2,6,6-tetramethylpiperidine-2-hydroxybenzophenone-1,3,5-triazine derivatives as photostabilizers for polymer materials". J Photochem Photobiol A Chemistry, 2002, vol. 146, No. 3, pp. 199-205.
Bojinov, "Synthesis of novel bifunctional hindered amine-UV absorber polymer stabilizers",Polymer Degradation and Stability, 2006, vol. 91, No. 1, pp. 128-135.
Calvert, Loss of Additives from Polymers: A Theoretical Model, Journal of Applied Polymer Science, Jul. 15, 1979, vol. 24, No. 2, pp. 357-370.
Feldshtein, "Solubility of antioxidants in polyethylene" Plast Massy, 1971, vol. 11, pp. 52, 53, 70, 58 & 59.
Jasso, "Evaluation of novel 4,4-dimethyloxazolidine derivatives as thermal and UV stabilisers in linear low density polyethylene (LLDPE) film", Polymer Degradation and Stability, 1999, vol. 64, No. 2, pp. 277-287.
Jasso, "Evaluation of some amino-S-triazines and their N-oxyl-derivatives as thermal and UV stabilisers in polypropylene films", Polymer Degradation and Stability, 1999 vol. 65, No. 2, pp. 199-206.
La Mantia, "Improvement of photo-stability of LLDPE-based nanocomposites", Polymer Degradation and Stability, 2006, vol. 91, No. 12, pp. 3208-3213.
Lazare, "Solubility of a UV-stabiliser in some poly(ester-block-ether) copolymers", Polymer, 2001, vol. 42, No. 3, pp. 1001-1007.
Olson, "Thermal Loss of Ultraviolet Absorbers from BPA-Polycarbonate", Macromolecules, 1990, vol. 23, No. 16, pp. 3762-3768.
Zeynalov, "Modelling light stabilizers as thermal antioxidants", Polymer Degradation and Stability, 2006, vol. 91, No. 12, pp. 3390-3396.
International Search Report for International PCT Application No. PCT/US2012/031402 Mailed on Nov. 1, 2012, 3 pages.

* cited by examiner

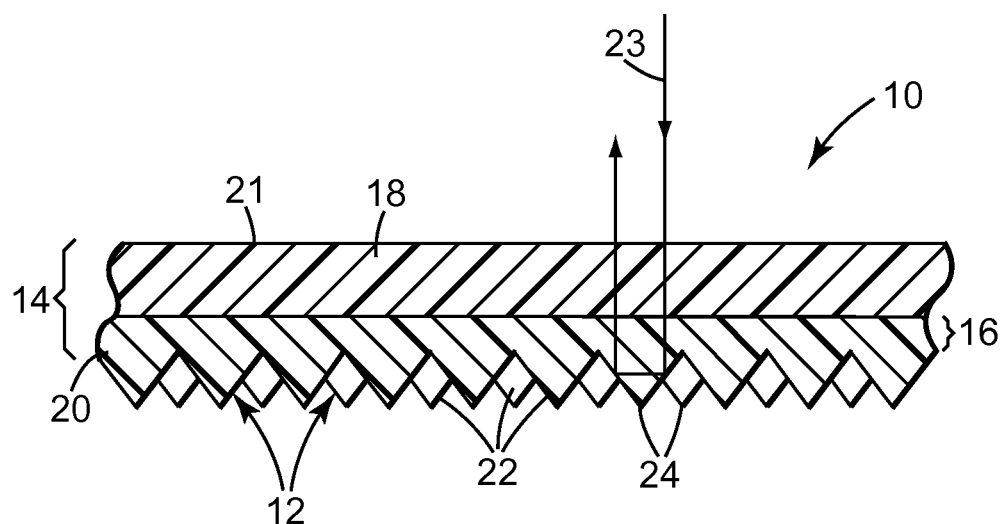

FILMS INCLUDING TRIAZINE-BASED ULTRAVIOLET ABSORBERS

TECHNICAL FIELD

The present application generally relates to poly(ethylene-co-acrylic acid) ("EAA") films including at least one triazine-based ultraviolet absorber. The present application also generally relates to retroreflective sheeting including an EAA film including a triazine-based ultraviolet absorber.

BACKGROUND

Retroreflective sheeting is capable of redirecting incident light towards its originating source. This unique ability has led to the wide-spread use of retroreflective sheeting on a variety of articles. Exemplary uses for retroreflective sheeting includes, for example, road signs, barricades, license plates, pavement markers and pavement marking tape, as well as retroreflective tapes for vehicles and clothing. There are two types of retroreflective sheeting: beaded sheeting and prismatic, or cube corner, sheeting. Beaded sheeting employs a multitude of glass or ceramic microspheres to retroreflect incident light. Prismatic sheeting typically employs a multitude of cube corner elements to retroreflect incident light.

SUMMARY

One embodiment of the present application relates to a film, comprising poly(ethylene-co-acrylic acid) and a triazine-based UVA. The film can include more than one triazine-based UVA. In some embodiments, the retroreflective sheeting may further include a land layer between the cube corner elements and the body layer. In some embodiments, the body layer may further include at least one of a benzotriazole-based UVA and a benzophenone-based UVA. In some embodiments, the body layer has a thickness of between about 20 micrometers and about 1,000 micrometers. In some embodiments, the body layer has a thickness of between about 1.3 mils (33 micrometers) and about 4 mils (101.6 micrometers). In some embodiments, the triazine-based UVA has a molecular weight of greater than about 350. In some embodiments, the triazine based UVA has one or more bulky side groups.

Another embodiment of the present application relates to retroreflective sheeting, comprising: a plurality of cube corner elements; and a body layer adjacent to the cube corner elements, the body layer including poly(ethylene-co-acrylic acid) and a triazine-based UVA. The sheeting can include more than one triazine-based UVA. Some embodiments, the retroreflective sheeting further includes a land layer between the cube corner elements and the body layer. In some embodiments, the body layer further includes at least one of a benzotriazole-based UVA and a benzophenone-based UVA. In some embodiments, the retroreflective sheeting includes a body layer that has a thickness of between about 20 micrometers and about 1,000 micrometers. In some embodiments, the body layer has a thickness of between about 1.3 mils (33 micrometers) and about 4 mils (101.6 micrometers). In some embodiments, the triazine-based UVA has a molecular weight of greater than about 350. In some embodiments, the triazine-based UVA has one or more bulky side groups.

BRIEF DESCRIPTION OF DRAWINGS

FIG. 1 is a cross-sectional view of an exemplary cube corner retroreflective sheeting.

DETAILED DESCRIPTION

Various embodiments and implementations will be described in detail. These embodiments should not be construed as limiting the scope of the present application in any manner, and changes and modifications may be made without departing from the spirit and scope of the inventions. For example, many of the embodiments, implementations, and examples are discussed with specific reference to retroreflective sheeting, but these should not be construed to limit the application scope to this one exemplary implementation. Further, only some end uses have been discussed herein, but end uses not specifically described herein are included within the scope of the present application. As such, the scope of the present application should be determined by the claims.

FIG. 1 is a cross-sectional view of a portion of an exemplary prismatic retroreflective sheeting 10. Retroreflective sheeting 10 includes a plurality of cube corner elements 12 and a body portion 14. In the embodiment shown in FIG. 1, body portion 14 includes a land layer 16 and a body layer 18. Body layer 18 typically functions to protect retroreflective sheeting 10 from environmental elements and/or to provide significant mechanical integrity to retroreflective sheeting 10. In the exemplary embodiment shown in FIG. 1, body layer 18 is the outermost layer on the front side of retroreflective sheeting 10. Light enters retroreflective sheeting 10 through the front surface 21. Light then passes through body portion 14 and strikes the faces 22 of cube corner elements 12 and returns in the direction from which it came, as schematically shown by arrow 23. Those of skill in the art will appreciate that retroreflective sheeting 10 can also include one or more top films (not shown) and/or seal films. Also, those of skill in the art will appreciate that body layer 18 can act as a top film in some embodiments.

Cube corner elements 12 project from a first or rear side 20 of body portion 14. Cube corner elements 12 are typically formed of a light transmissible polymeric material having an elastic modulus greater than $3 \times 10^8$ pascals. By light transmissible, applicant means that the polymer is able to transmit at least about 70 percent of the intensity of the light incident upon it at a given wavelength. In some embodiments, the polymers that are used in the cube corner elements have a light transmissibility of greater than 80 percent, and in other embodiments, they transmit greater than 90 percent of incident light. Cube corner elements 12 typically have a height in the range of about 20 to about 500 micrometers, and more typically in the range of about 35 to about 180 micrometers.

In some embodiments, cube corner elements 12 and land layer 16 are made from similar or the same types of polymers. In some embodiments, land layer 16 is of a minimal thickness (e.g., in the range of about 0 micrometers to about 150 micrometers, and preferably in the range of approximately about 1 micrometer to about 100 micrometers). In some embodiments, it is preferred that the land layer be of minimal thickness, but in those specific embodiments, it may be desirable for retroreflective sheeting 10 to possess some land layer 16 so that a flat interface can be provided between land layer 16 and body layer 18. In the specific exemplary embodiment shown in FIG. 1, land layer 16 is distinguished from body layer 18 by being a layer disposed immediately adjacent to the base of cube corner elements 12. However, those of skill in the art will appreciate that the present disclosure is meant to encompass variations of this specific embodiment, such as, for example, retroreflective sheeting that does not include a land layer, that includes a much thinner or thicker land layer, and/or where the land layer and body layer are the same material.

Body layer 18 typically includes a light transmissible polymeric material having an elastic modulus less than $7 \times 10^8$ pascals. Body layer 18 typically has a thickness between about 20 micrometers and about 1,000 micrometers, and preferably between about 50 micrometers and about 250 micrometers, and more preferably between about 1.3 mils and 4 mils. Although the specific embodiment shown in FIG. 1 has a single body layer 18, it is within the scope of the present disclosure to provide more than one body layer 18 in body portion 14. A wide array of polymers can be used in the body layer, as is described in, for example, U.S. Pat. No. 5,450,235 (Smith et al.), incorporated by reference herein. One such exemplary polymer is poly(ethylene-co-acrylic acid) (also referred to as "EAA").

U.S. Pat. No. 5,450,235 also states that the body layer may include UV absorbers (also referred to as "UVAs"). UVAs are used in retroreflective sheeting to protect films containing optical layers from the harmful radiation of the sun in the solar light spectrum (between about 290 nm and 400 nm). Most UVAs are incompatible with EAA because they migrate or leach out of the EAA film. When UVAs migrate or leach out of the body layer, the resulting retroreflective film loses its UVA protection and can be subject to degradation as a result of exposure to harmful UV light. This degradation can cause the retroreflective sheeting to suffer a loss of retroreflectivity, and, at some point, the sheeting may no longer be fit for its intended use. Only a combination of benzotriazole- and benzophenone-based UVAs have been used in or with EAA films.

In some embodiments, the triazine-based UVA is soluble in the body layer, rendering it transparent. Transparency may be important in retroreflective applications. As used herein, transparent means that the body layer is able to transmit at least about 70 percent of the intensity of the light incident upon it at a wavelength greater than about 400 nm (light transmissibility). In some embodiments, the body has a light transmissibility of greater than 80 percent, and in other embodiments, the light transmissibility is greater than 90 percent of incident light.

The chemical formula for benzotriazole-based UVAs is shown below:

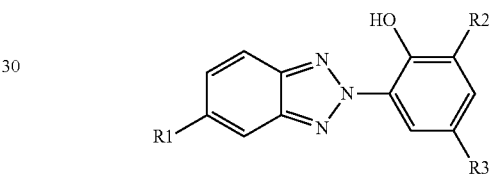

Some exemplary commercially available benzotriazole-based UVAs are shown in Table I.

TABLE I

| Exemplary Commercially Available Benzotriazole-Based UVAs | | | | |
|---|---|---|---|---|
| Name | Supplier | R1 | R2 | R3 |
| Tinuvin ™ 234 | BASF (Florham Park, NJ) | H | —C(CH$_3$)$_2$C$_6$H$_6$ | —C(CH$_3$)$_2$C$_6$H$_6$ |
| Lowilite ™ 234 | CHEMTURA Corporation (Middlebury, CT) | | | |
| Tinuvin ™ 326 | BASF | Cl | t-butyl | CH3 |
| Lowilite ™ 26 | CHEMTURA Corporation | | | |
| Tinuvin ™ 327 | BASF | Cl | t-butyl | t-butyl |
| Lowilite ™ 27 | CHEMTURA Corporation | | | |
| Tinuvin ™ 328 | BASF | H | —C(CH$_3$)$_2$CH$_2$CH$_3$ | —C(CH$_3$)$_2$CH$_2$CH$_3$ |
| Cyasorb ™ 2337 | CYTEC Industries (Woodland Park, NJ) | | | |
| Lowilite ™ 28 | CHEMTURA Corporation | | | |
| Tinuvin ™ 329 | BASF | H | H | 1,1,3,3-tetramethyl butyl |
| Cyasorb ™ 5411 | CYTEC Industries | | | |
| Lowilite ™ 29 | CHEMTURA Corporation | | | |
| Tinuvin ™ 384 | BASF | H | t-butyl | propanoic acid, C$_7$-C$_9$ branched alkyl esters |
| Tinuvin ™ 928 | BASF | H | —C(CH$_3$)$_2$C$_6$H$_6$ | 1,1,3,3-tetramethyl butyl |
| Tinuvin ™ 1130 | BASF | H | t-butyl | propanoic acid, polyethylene glycol esters (PEG 300) |

TABLE I-continued

Exemplary Commercially Available Benzotriazole-Based UVAs

| Name | Supplier | R1 | R2 | R3 |
|---|---|---|---|---|
| Mixxim ™ BB100 | Fairmount Chemical Co (Newark, NJ) | H | $CH_2$ (dimer) | t-octyl |

Table I shows exemplary benzotriazole-based UVAs with molecular weights ranging from about 200 to about 500.

The chemical formula for benzophenone-based UVAs is shown below

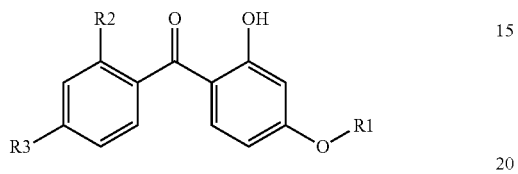

Some exemplary commercially available benzophenone-based UVAs are shown in Table II.

TABLE II

Exemplary Commercially Available Benzophenone-Based UVAs

| Name | Supplier | R1 | R2 | R3 |
|---|---|---|---|---|
| Cyasorb ™ UV531 | CYTEC Industries | $C_8H_{17}$ | H | H |
| Uvinul ™ 3008 | BASF | | | |
| Lowilite ™ 22 | CHEMTURA Corporation | | | |
| Uvinul ™ 408 | BASF | | | |
| Uvinul ™ 3040 | BASF | $CH_3$ | H | H |
| Lowilite ™ 20 | CHEMTURA Corporation | | | |
| Cyasorb ™ UV9 | CYTEC Industries | | | |
| Cyasorb ™ UV24 | CYTEC Industries | $CH_3$ | OH | H |
| Uvinul ™ 3049 | BASF | $CH_3$ | OH | $OCH_3$ |
| Uvinul ™ 3050 | BASF | H | OH | OH |
| Uvinul ™ 3000 | BASF | H | H | H |
| Lowilite ™ 24 | CHEMTURA Corporation | | | |
| Uvinul ™ 19 | BASF | H | H | $CH_2CH_2OH$ |
| Cyasorb ™ 198 | CYTEC Industries | | | |
| BOBP | | $C_{12}H_{25}$ | H | H |
| Cyasorb ™ UV 416 | CYTEC Industries | $CH_2CH_2OC(O)CH=CH_2$ | H | H |
| Cyasorb ™ UV 2098 | | | | |
| Cyasorb ™ UV 2126 | CYTEC Industries | Polymer of UV416 (~50,000 g/mol) | | |

Table II shows exemplary benzophenone-based UVAs with molecular weights greater than about 200.

EAA films including a combination of benzotriazole- and benzophenone-based UVAs typically show a migration rate (the rate at which the UVA migrates and/or leaches out of the EAA film) of about 40% per year in Florida weather and about 20% per year in Minnesota weather.

Consequently, the inventors of the present application saw a need to find one or more UVAs that are more stable in and will remain in an EAA body layer for a longer period of time. Also, the inventors of the present application saw a need for a retroreflective film including a body layer including EAA that would provide sufficient long-term durability and weatherability.

The inventors of the present application found that a specific class or type of UVAs are retained in an EAA film about two times longer when compared with currently used UVAs. Specifically, the present application is directed to the inclusion of one or more triazine-based UVAs in an EAA film. Triazine-based UVAs are generally described by the following chemical formula:

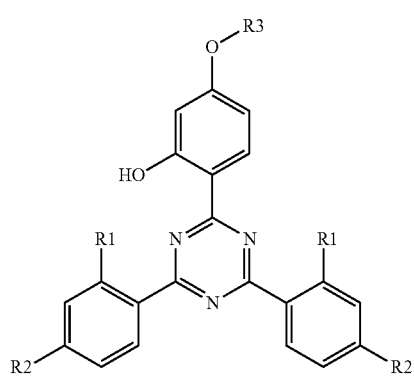

Some exemplary commercially available triazine-based UVAs are shown in Table III.

TABLE III

Exemplary Commercially Available Triazine-Based UVAs

| Commercial Name | Supplier | R1 | R2 | R3 |
|---|---|---|---|---|
| Tinuvin ™ 405 | BASF | CH$_3$ | CH$_3$ | *-CH$_2$-CH(OH)-CH$_2$-O-CH$_2$-CH(C$_2$H$_5$)-CH$_2$-CH$_2$-CH$_2$-CH$_3$ |
| Tinuvin ™ 1577 | BASF | H | H | *-C$_6$H$_{13}$ |
| Cyasorb ™ UV1164 | CYTEC Industries | CH$_3$ | CH$_3$ | *-C$_8$H$_{17}$ |
| Tinuvin ™ 479 | BASF | H | phenyl | *-CH(CH$_3$)-C(=O)-O-(CH$_2$)$_7$-CH$_3$ |
| Tinuvin ™ 400 | BASF | CH$_3$ | CH$_3$ | *-CH$_2$-CH(OH)-CH$_2$-O-C$_{12\text{-}13}$H$_{25\text{-}27}$ |
| CGX UVA006 | BASF | H | phenyl | *-C$_6$H$_{13}$ |

Table III shows exemplary triazine-based UVAs with molecular weights greater than about 350.

The inventors of the present application discovered that triazine-based UVAs remain in EAA films about two times longer than prior art UVAs used in EAA films. Because the UVAs remain in the EAA films longer, the retroreflective sheeting including these films retains its retroreflectivity longer. This is at least in part due to the fact that a body layer including UVAs protects the materials and structures beneath the body layer.

In some embodiments, the EAA film includes only triazine-based UVAs. In other embodiments, the EAA film includes one or more triazine-based UVAs and one or more additional UVAs. Exemplary additional UVAs include, but are not limited to, benzotriazole- and benzophenone-based UVAs.

In some preferred embodiments, the triazine-based UVAs have bulky side groups. A bulky side group is used herein to refer a side group including at least six carbon atoms. The exemplary commercially available triazine-based UVAs shown in Table III are non-limiting examples of UVAs including at least one bulky side group.

The following examples describe some exemplary constructions and methods of constructing various embodiments within the scope of the present application. The following examples are intended to be illustrative, but are not intended to limit the scope of the present application.

EXAMPLES

Test Methods

Retroreflectivity ($R_A$):

The coefficient of retroreflection $R_A$ (retroreflectivity) was measured following the procedure outlined in ASTM E-810-03 "Test Method for Coefficient of Retroreflection of Retroreflective Sheeting Utilizing the Coplanar Geometry." $R_A$ was measured at discrete observation angles and averaged over the annular region between two adjacent measured observation angles.

Weathering:

Two exposure cycles were used in the following examples: (1) exposure test cycle "1a" specified in Table X1.1 in ASTM-G-152-06 "Standard Practice for Operating Open Flame Carbon Arc Light Apparatus for Exposure of Nonmetallic Materials," referred to as "Cycle A;" and (2) exposure test cycle "1" specified in Table X3.1 in ASTM G-155-05a "Standard Practice for Operating Xenon Arc Light Apparatus for Exposure of Non-Metallic Materials," referred to as "Cycle B". Exposure time was of about 1000, 1500 or 1800 hours.

Materials

| | |
|---|---|
| BAED | Bisphenol-A epoxy diacrylate, obtained from Cytek Industries, Smyrna, GA, under the trade designation "EBECRYL 3720." |
| DMAEA | Dimethylaminoethyl acrylate, obtained from Cytec Industries. |
| TMPTA | Trimethylol propane triacrylate, obtained from Cytec Industries. |
| HDDA | 1,6 Hexanediol diacrylate, obtained from Cytec Industries. |
| TPO | 2,4,6-trimethylbenzoyl diphenylphosphine oxide, a photoinitiator, obtained from Sigma-Aldrich, St. Louis, MO. |
| EAA | Ethylene acid acrylate obtained from Dow Company, Midland, MI, under the trade designation "PRIMACOR 3340." |

-continued

| | |
|---|---|
| PET | Polyethylene terephatalate |
| A/A-EVA | Acid/acrylate modified ethylene vinyl acetate (EVA) copolymer obtained from DuPont, Wilmington, DE, under the trade designation "BYNEL 3101." |
| HDPE | High density polyethylene film such as those obtained from Lyondell Chemical Company, Lansing, MI. |
| HPT | 2-[4-[(2-Hydroxy-3-(2'-ethyl)hexyl)oxy]-2-hydroxyphenyl]-4,6-bis(2,4-dimethylphenyl)-1,3,5-triazine, a hydroxyphenyl triazine obtained from BASF, Florham Park, NJ, under the trade designation "TINUVIN 405." |
| HALS | Poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]]), a hindered amine light stabilizer obtained from BASF, under the trade designation "CHIMASSORB 944." |
| BPN | (benzophenone) UV absorber obtained from Chemtura Corporation, Middlebury, CT, under the trade designation "LOWILITE 22." |
| BTZ | 2-(2H-benzotriazol-2-yl)-4,6-ditertpentyl phenol (benzotriazole) UV absorber obtained from BASF under the trade designation "TINUVIN 328." |

Comparative Example A and Example 1

A retroreflective film was prepared by (1) providing a body layer; (2) preparing a retroreflective layer by casting cube corner microstructures onto the body layer as described in U.S. Pat. No. 5,691,846 (Benson), incorporated herein by reference; and (3) laminating a multi-layer sealing film to the cube corner microstructures.

Preparation of Body Layer:

A body layer was prepared by extruding EAA and one or more ultraviolet light absorbers (UVA) at a film thickness of 0.01 cm (4 mil) onto a corona treated polyethylene terephthalate (PET) carrier. Pellets of EAA and selected UVAs, as shown in Table 1 below, were fed into a 1.9 cm (0.75 in.) single screw extruder (obtained from C.W. Brabender Instruments Inc., South Hackensack, N.J.) set at a temperature of 140° C. (284° F.) for zone 1 and 175° C. (347° F.) at the extruder exit and die, resulting in a melt temperature of about 175° C. (347° F.). As the molten resin exited the extruder, it passed through a conventional horizontal film die (obtained from Extrusion Dies Industries LLC, Chippewa Falls, Wis., under the trade designation "ULTRAFLEX-40") and was cast onto the PET carrier traveling at about 36 m/min (120 ft/min). The resulting molten body layer on the PET carrier was run between a rubber roll/chilled steel roll nip to solidify the molten resin into a layer. The EAA surface was corona treated at an energy of about 1.5 J/cm².

Composition of the EAA body layers with selected UVAs in weight percent (wt-%) is shown in Table 1, below.

TABLE 1

Composition of EAA Body layers including Selected UVSs.

| Body layer | UVSs | Amount (wt-%) |
|---|---|---|
| Comparative Body layer A | BPN/BTZ/HALS | 0.96/0.64/0.64 |
| Body layer 1 | HPT/HALS | 1.5/0.6 |

Preparation of the Retroreflective Layer:

A retroreflective layer was prepared by casting a mixture of 25 wt % BAED, 12 wt-% DMAEA, 38 wt-% TMPTA, 25 wt-% 1.6 HDDA, and 0.5 pph (parts per hundred) of TPO through a die onto a rubber roll. The rubber roll contacted the EAA side of the body layer transferring the mixture onto the body layer. The coated body layer was brought in contact with a patterned tool roll heated to 170° F. (77° C.) containing a plurality of cube corner cavities. The patterned tool roll was mounted on a mandrel rotating in a counterclockwise motion at about 25 fpm (7 m/min). The composition coated on the body layer completely filled the cube corner cavities and the entire construction was cured through the body layer with twelve Fusion "D" lamps 641 (Fusion Systems) set at 600 W/in. Dichroic filters were used in front of the UV lamps. A retroreflective layer was prepared upon completion of the curing process and removal of the cured film with cube corner microstructures thereon from the patterned tool roll. The retroreflective layer was irradiated by a Fusion D UV lamp operating at 50% to provide a post-UV irradiation cure through the cube corner microstructures. The retroreflective layer was then passed through an oven set at 127° C. (260° F.).

The resulting cube corner microstructures had three sets of intersecting grooves with a pitch (i.e. primary groove spacing) of 0.007 inches (0.18 mm). The intersecting grooves formed a cube corner base triangle included angles of 55.5/55.5/69 degrees and a cube corner element height of 76.2 microns (3.5 mil). The primary groove spacing is defined as the groove spacing between the grooves which form the two 55° base angles of the base triangle.

Preparation of Sealing Film:

A sealing film was prepared as described in co-pending U.S. Patent Application Ser. No. 61/350,269, filed on Jun. 1, 2010 and assigned to the assignee of the present application. The coextruded sealing film comprised a two-layer construction of an A/A-EVA film and a third polyolefin layer. The two-layer construction further comprised a first layer that was clear and a second layer that was pigmented. Specifically, the second, pigmented, layer was prepared by feeding pellets of A/A-EVA mixed with 20% by weight of an 80/20 TiO₂/EVA blend into an extruder and the third layer was prepared by extruding HDPE onto the pigmented side of the two-layer construction at a thickness of 0.005 cm (2 mil) using a blown film extrusion process. The clear A/A-EVA side of the sealing film construction was corona treated at an energy of roughly 1 J/cm².

Next, retroreflective films were prepared by laminating the cube corner microstructure side of the retroreflective layer to the clear A/A-EVA layer of the sealing film using a 121.92 cm (48 in) wide laminator composed of a rubber roll and a heated emboss roll with a hexagonal seal pattern. The HDPE layer of the sealing film was placed against the heated emboss roll at a temperature of 250° F. (121° C.). During sealing, the lamination pressure ranged from 700 to 1100 psi (4.8 to 7.6 MPa) and line speed was 25 fpm (7 m/min).

Comparative Example A

A retroreflective film was prepared as described above using Comparative Body layer A.

Example 1

A retroreflective film was prepared as described above using Body layer 1.

The retroreflective films of Comparative Example A and Example 1 were submitted to exposure cycles A and B for 1500 or 1800 hours, respectively, according to the weathering test method described above. Retroreflectivity ($R_A$) of the films at 0.2° observation angle (obs.), −4° and 30° entrance angles (ent.), and 0° and 90° orientation angles (orientation) were measured before (Initial $R_A$) and after exposure (Final $R_A$). Percent retroreflectivity retention (Ret.) was calculated. Results are reported in Tables 2 and 3, below.

TABLE 2

Comparison of Comparative Example A and Example 1 at 1000 hours exposure cycle

| Examples | Obs./Ent./Orient. Angles (°) | Cycle A 1000 hours | | | Cycle B 1000 hours | | |
|---|---|---|---|---|---|---|---|
| | | Initial $R_A$ (cd/lux · m²) | Final $R_A$ (cd/lux · m²) | Ret. (%) | Initial $R_A$ (cd/lux · m²) | Final $R_A$ (cd/lux · m²) | Ret. (%) |
| Comp. Example A | 0.2/−4/0 | 757 | 246 | 32 | 697 | 398 | 57 |
| | 0.2/−4/90 | 792 | 301 | 38 | 718 | 393 | 55 |
| | 0.2/30/0 | 439 | 122 | 28 | 418 | 184 | 44 |
| | 0.2/30/90 | 596 | 189 | 32 | 554 | 238 | 43 |
| Example 1 | 0.2/−4/0 | 617 | 750 | 122 | 561 | 756 | 135 |
| | 0.2/−4/90 | 617 | 643 | 104 | 487 | 611 | 126 |
| | 0.2/30/0 | 327 | 404 | 124 | 302 | 466 | 154 |
| | 0.2/30/90 | 439 | 483 | 110 | 353 | 469 | 133 |

TABLE 3

Comparison of Comparative Example A and Example 1

| Examples | Obs./Ent./Orient. Angles (°) | Cycle A (1500 hrs) | | | Cycle B (1800 hrs) | | |
|---|---|---|---|---|---|---|---|
| | | Initial $R_A$ cd/lux · m² | Final $R_A$ cd/lux · m² | Ret. (%) | Initial $R_A$ cd/lux · m² | Final $R_A$ cd/lux · m² | Ret. (%) |
| Comp. Example A | 0.2/−4/0 | 757 | 167 | 22 | 697 | 207 | 30 |
| | 0.2/−4/90 | 792 | 196 | 25 | 718 | 229 | 32 |
| | 0.2/30/0 | 439 | 61 | 14 | 418 | 71 | 17 |
| | 0.2/30/90 | 596 | 87 | 15 | 554 | 111 | 20 |
| Example 1 | 0.2/−4/0 | 617 | 807 | 131 | 561 | 764 | 136 |
| | 0.2/−4/90 | 617 | 632 | 102 | 487 | 563 | 116 |
| | 0.2/30/0 | 327 | 405 | 124 | 302 | 500 | 165 |
| | 0.2/30/90 | 439 | 444 | 101 | 353 | 411 | 117 |

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

What is claimed is:
1. A film, comprising:
poly(ethylene-co-acrylic acid); and
a triazine-based ultraviolet absorber having the following chemical formula:

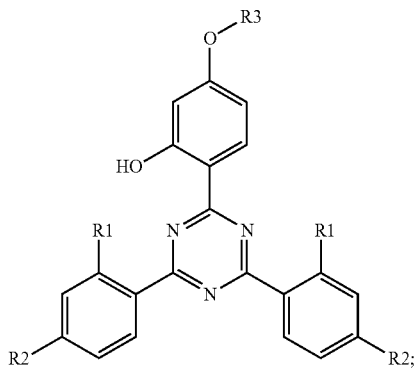

wherein:
R1 is one of $CH_3$ and H,
R2 is one of $CH_3$, H, and phenyl, and
R3 is one of $C_6H_{13}$,

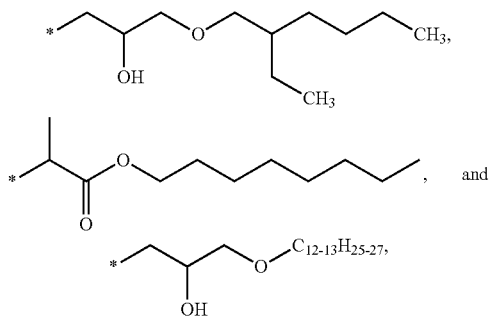

and
a retroreflective sheeting comprising a plurality of cube corner elements and a body layer comprising the film, the body layer being adjacent to the cube corner elements, after exposure to 1500 hours of an exposure test cycle that is ASTM-G-152-06 test cycle 1a or ASTM-G-155-05a exposure test cycle 1, has a retroreflectivity retention at an observation angle of 0.2 degree with −4 degree or 30 degree entrance angles and with 0 or 90 degree orientation angles that is greater than a retroreflectivity retention measured using the same exposure test cycle at the same observation angle at the same entrance and orientation angles of a corresponding retroreflective sheeting having a body layer comprising a corresponding film that is free of the triazine-based ultraviolet absorber.

2. The film of claim 1, further comprising:
at least one of a benzotriazole-based ultraviolet absorber and a benzophenone-based ultraviolet absorber.

3. The film of claim 1, having a thickness of between about 20 micrometers and about 1,000 micrometers.

4. The film of claim 3, having a thickness of between about 1.3 mils and about 4 mils.

5. The film of claim 1, wherein the triazine-based ultraviolet absorber has a molecular weight of greater than about 350.

6. The film of claim 1, wherein the triazine-based ultraviolet absorber has one or more bulky side groups.

7. The film of claim 1, further comprising:
a retroreflective sheeting positioned adjacent thereto.

8. The film of claim 7, wherein the retroreflective sheeting is prismatic.

9. The film of claim 1, wherein
R1 is $CH_3$,
R2 is $CH_3$, and
R3 is

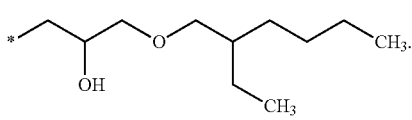

10. The film of claim 1, wherein a retroreflective sheeting comprising a plurality of cube corner elements and a body layer comprising the film, the body layer being adjacent to the cube corner elements, after exposure to 1500 hours of an exposure test cycle that is ASTM-G-152-06 test cycle 1a or ASTM-G-155-05a exposure test cycle 1, has a retroreflectivity retention at an observation angle of 0.2 degree with −4 degree or 30 degree entrance angles and with 0 or 90 degree orientation angles that is at least two times greater than a retroreflectivity retention measured using the same exposure test cycle at the same observation angle at the same entrance and orientation angles of a corresponding retroreflective sheeting having a body layer that comprises a corresponding film that is free of the triazine-based ultraviolet absorber.

11. The film of claim 1, wherein the film further comprises a hindered amine light stabilizer, wherein a retroreflective sheeting comprising a plurality of cube corner elements and a body layer comprising the film, the body layer being adjacent to the cube corner elements, after exposure to 1500 hours of an exposure test cycle that is ASTM-G-152-06 test cycle 1a or ASTM-G-155-05a exposure test cycle 1, has a retroreflectivity retention at an observation angle of 0.2 degree with −4 degree or 30 degree entrance angles and with 0 or 90 degree orientation angles that is at least two times greater than a retroreflectivity retention measured using the same exposure test cycle at the same observation angle at the same entrance and orientation angles of a corresponding retroreflective sheeting having a body layer comprising a corresponding film that is free of the triazine-based ultraviolet absorber but comprises the same hindered amine light stabilizer and further comprises a benzophenone-based ultraviolet light absorber and a benzotriazole-based ultraviolet light absorber.

12. Retroreflective sheeting, comprising:
a plurality of cube corner elements; and
a body layer adjacent to the cube corner elements, the body layer comprising poly(ethylene-co-acrylic acid) and a triazine-based ultraviolet absorber having the following chemical formula:

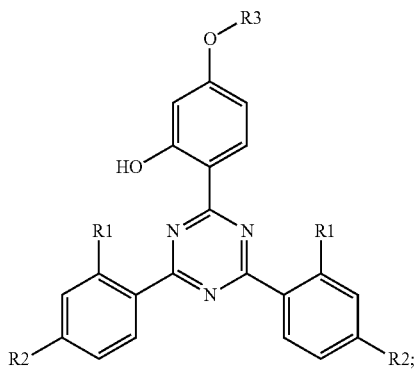

wherein:
R1 is one of $CH_3$ and H,
R2 is one of $CH_3$, H, and phenyl, and
R3 is one of $C_6H_{13}$,

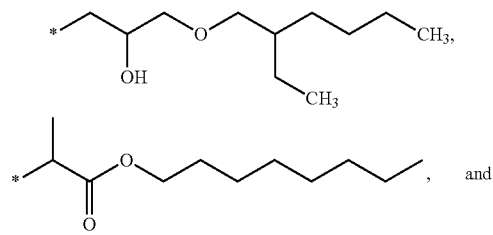

-continued

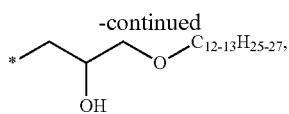

and the retroreflective sheeting, after exposure to 1500 hours of an exposure test cycle that is ASTM-G-152-06 test cycle 1a or ASTM-G-155-05a exposure test cycle 1, has a retroreflectivity retention at an observation angle of 0.2 degree with −4 degree or 30 degree entrance angles and with 0 or 90 degree orientation angles that is greater than a retroreflectivity retention measured using the same exposure test cycle at the same observation angle at the same entrance and orientation angles of a corresponding retroreflective sheeting having a body layer comprising a corresponding film that is free of the triazine-based ultraviolet absorber.

13. The retroreflective sheeting of claim 12, further comprising:

a land layer between the cube corner elements and the body layer.

14. The retroreflective sheeting of claim 12, wherein the body layer further comprises at least one of a benzotriazole-based ultraviolet absorber and a benzophenone-based ultraviolet absorber.

15. The retroreflective sheeting of claim 12, wherein the body layer has a thickness of between about 20 micrometers and about 1,000 micrometers.

16. The retroreflective sheeting of claim 12, wherein the body layer has a thickness that is between about 1.3 mils and about 4 mils.

17. The retroreflective sheeting of claim 12, wherein the triazine-based ultraviolet absorber has a molecular weight of between about 350 and about 650.

18. The retroreflective sheeting of claim 12, wherein the triazine-based ultraviolet absorber has one or more bulky side groups.

19. A method of using the retroreflective sheeting of claim 12, comprising:

exposing the sheeting to 1500 hours of an exposure test cycle selected from a group consisting of exposure test cycle 1a of ASTM-G-152-06 and exposure test cycle 1 in ASTM G-155-05a, wherein the sheeting has a retroreflectivity retention greater than about 50% at an observation angle of less than 0.5 degree.

20. The method of using the retroreflective sheeting of claim 19, wherein the retroreflectivity retention is greater than about 50% at an observation angle of 0.2 degree.

* * * * *